(12) United States Patent
Krupenkin et al.

(10) Patent No.: US 9,999,273 B2
(45) Date of Patent: Jun. 19, 2018

(54) SOLE FOR FOOTWEARS CAPABLE OF RECOVERING PART OF THE ENERGY PRODUCED DURING DEAMBULATION

(71) Applicant: VIBRAM S.p.A, Albizzate (VA) (IT)

(72) Inventors: Tom Krupenkin, Madison, WI (US); Joseph Ashley Taylor, Madison, WI (US); Virgilio Mattoli, Genoa (IT); Francesco Greco, Genoa (IT); Barbara Mazzolai, Genoa (IT); Alessio Mondini, Genoa (IT)

(73) Assignee: VIBRAM S.P.A., Albizzate (VA) (IT)

(*) Notice: Subject to any disclaimer, the term of this patent is extended or adjusted under 35 U.S.C. 154(b) by 0 days. days.

(21) Appl. No.: 14/781,790

(22) PCT Filed: Feb. 2, 2015

(86) PCT No.: PCT/IB2015/050777
§ 371 (c)(1),
(2) Date: Oct. 1, 2015

(87) PCT Pub. No.: WO2015/170196
PCT Pub. Date: Nov. 12, 2015

(65) Prior Publication Data
US 2017/0042275 A1 Feb. 16, 2017

(30) Foreign Application Priority Data
May 9, 2014 (IT) .............................. VR2014A0127

(51) Int. Cl.
*A43B 3/00* (2006.01)
*F03G 7/08* (2006.01)
(Continued)

(52) U.S. Cl.
CPC ............... *A43B 3/0015* (2013.01); *F03G 5/06* (2013.01); *F03G 7/08* (2013.01); *H02N 11/002* (2013.01)

(58) Field of Classification Search
CPC ........ H02N 11/002; H02N 99/00; A43B 7/04; A43B 3/0015; F03G 7/08
(Continued)

(56) References Cited

U.S. PATENT DOCUMENTS 3,496,871 A * 2/1970 Stengel .................... F04B 17/00
310/12.12
4,175,566 A * 11/1979 Millar ...................... G01F 1/588
600/505
(Continued)

FOREIGN PATENT DOCUMENTS

| DE | 10349357 A1 | 7/2004 |
| WO | 2009048438 A1 | 4/2009 |
| WO | 2014028799 A1 | 2/2014 |

OTHER PUBLICATIONS

International Search Report for corresponding application PCT/IB2015/050777 filed Feb. 2, 2015; dated Apr. 22, 2015.
(Continued)

*Primary Examiner* — Julio C. Gonzalez R.
(74) *Attorney, Agent, or Firm* — Cantor Colburn LLP (57) ABSTRACT

A sole for footwear capable of recovering part of the energy produced during deambulation including: at least one energy harvesting means, including: a tubular body, fixed in use, having a first and a second end and a movable part slidable in the tubular body; the energy harvesting means being provided, in use, for generating electrical energy following the sliding of the movable part with respect to the tubular body that is fixed in use, during the deambulation; at least one actuator group for the energy harvesting means, including at least one fluid-dynamic circuit including: at least one
(Continued)

first and one second tank including a fluid, the first tank being housed at a rear area of the sole and the second tank being housed at a front area of the sole; at least one first and one second joining conduit in fluid connection between the first tank and the first end of the at least one tubular body, and the second tank and the second end of the tubular body, respectively, where the first tank has a configuration in plan view which is substantially elongated and curved.

14 Claims, 8 Drawing Sheets (51) Int. Cl.
*H02N 11/00* (2006.01)
*F03G 5/06* (2006.01)

(58) Field of Classification Search
USPC ........ 290/1 R; 310/11, 12.12; 417/410.1, 92; 36/1, 2.6, 137
See application file for complete search history.

(56) References Cited

U.S. PATENT DOCUMENTS

| | | | | |
|---|---|---|---|---|
| 5,483,759 A * | 1/1996 | Silverman | ............ | A43B 1/0072 36/1 |
| 5,495,682 A * | 3/1996 | Chen | .................... | A43B 3/0005 219/211 |
| 6,182,378 B1 * | 2/2001 | Sendaula | ................ | A43B 3/00 36/136 |
| 6,201,314 B1 | 3/2001 | Landry | | |
| 6,239,501 B1 * | 5/2001 | Komarechka | ............ | A43B 3/00 290/1 R |
| 6,865,825 B2 * | 3/2005 | Bailey, Sr. | ........... | A43B 1/0054 36/29 |
| 7,105,935 B2 * | 9/2006 | Hsu | ........................ | H02K 44/08 290/2 |
| 7,898,096 B1 * | 3/2011 | Krupenkin | ............... | H02N 1/08 290/1 R |
| 2006/0077762 A1 * | 4/2006 | Boland | .................... | H02N 1/08 367/170 |
| 2007/0145746 A1 | 6/2007 | Biamonte | | |
| 2008/0127510 A1 | 6/2008 | Yang | | |
| 2009/0126228 A1 | 5/2009 | Lee | | |
| 2013/0270839 A1 * | 10/2013 | Krupenkin | ............. | H02N 99/00 290/1 R |
| 2014/0049049 A1 * | 2/2014 | Krupenkin | ................ | F03G 5/06 290/1 A |
| 2014/0068973 A1 * | 3/2014 | Krupenkin | ........... | A43B 3/0015 36/136 |
| 2014/0182163 A1 * | 7/2014 | Krupenkin | ............... | A43B 7/02 36/2.6 |
| 2014/0368157 A1 * | 12/2014 | Alexander | ........... | A43B 3/0031 320/107 |

OTHER PUBLICATIONS

Written Opinion for corresponding application PCT/IB2015/050777 filed Feb. 2, 2015; dated Apr. 22, 2015.

* cited by examiner

SOLE FOR FOOTWEARS CAPABLE OF RECOVERING PART OF THE ENERGY PRODUCED DURING DEAMBULATION

TECHNICAL FIELD OF THE INVENTION

The present invention relates to a sole for footwear capable of recovering part of the energy produced during deambulation.

BACKGROUND

In the present description and the following claims, with the generic term "deambulation" it is intended the act of walking or running carried out by a person, while with the generic term "sole", it is intended the portion of the shoe comprising the outsole and the insole of the shoe itself.

In the state of the art so-called "energy harvesters" (in brief, EH) are known, which are able to store the available energy in one environment in order to render it directly usable. One example known to all is represented by photovoltaic cells, which store solar energy in order to convert it into directly-usable energy, for example, for the operation of a calculator or a watch or other electronic devices.

The energy harvesters available in the art are of different type according to the specific application; in the footwear field, an energy harvester has been recently proposed that is capable of storing the energy generated during deambulation in the form of pressure variations exerted by a foot on the shoe sole, in order to render such energy directly available for use.

A harvester of this type has for example been proposed by the U.S. company InStep Nanopower.

One such harvester is activated by a respective actuator group in response to the pressure variations exerted by the foot on the sole during deambulation. The actuator group comprises a fluid-dynamic circuit connected to the ends of the harvester.

Presently, however, one such harvester only allows storing a minimum part of the energy produced during deambulation, with the result that the quantity of energy recovered by the harvester is not actually sufficient for allowing, for example, the power supply of electronic devices directly or remotely connected to the harvester itself.

This is due to different factors. First, to the fact that the fluid-dynamic circuit, as it is configured, is unable to operate on the energy harvester in such a manner to allow it to convert a sufficient quantity of energy produced during deambulation into electrical energy.

It follows that the electrical energy produced by the harvester and accumulated by suitable accumulating/dispensing means is not sufficient for the power supply of electronic devices even operating with very limited powers, on the order of a few mWatt, up to 1-2 Watt.

There is therefore the need to provide a sole for footwear capable of recovering energy produced during deambulation in a more efficient manner with respect to the conventional soles of this type.

There is also the need to provide a sole for footwear capable of recovering part of the energy produced during deambulation having an alternative configuration with respect to those proposed up to now.

BRIEF SUMMARY

The invention improves the state of the art in the field of energy harvesting devices and, in particular, in the field of footwear.

A sole for footwear is provided that is capable of recovering energy produced during deambulation in a more efficient manner with respect to the previously-proposed soles of this type.

Additionally, a sole for footwear is provided that allows the power supply, both direct and remote, of new generation electronic devices.

Furthermore, a sole for footwear is provided capable of recovering energy produced during deambulation that has an alternative configuration with respect to the configuration of the previously-proposed footwear soles of this type.

Moreover, a sole for footwear is provided capable of recovering energy produced during deambulation that is easy to obtain at competitive costs.

BRIEF DESCRIPTION OF THE DRAWINGS

Other characteristics and advantages of the present invention will be more evident from the description of an embodiment of a sole for footwear capable of recovering energy produced during deambulation, illustrated merely as a non-limiting example in the enclosed drawings in which.

DETAILED DESCRIPTION

With reference to the enclosed figures, it will be observed that a sole for footwear according to the present invention, in the illustrated case a left-shoe sole, is indicated overall with the reference number 1 and has a rear area 2, provided in use for the heel support, a front area 3, provided in use for the support of the front portion of the foot, an outer side portion 4 and an inner side portion 5.

The sole according to the present invention comprises at least one energy harvesting means 6, intended in use, as will be stated hereinbelow, to convert at least part of the energy produced during deambulation into electrical energy.

Such energy harvester 6 is, for example, of the type and illustrated in WO 2014/028799 (particular reference is made to the FIG. 3 of such document) and comprises a tubular body 60, fixed during use, having a first end 61 and a second end 62.

The energy harvester 6 further comprises a movable part or body 63, slidably inserted in the tubular body 60. The movable part or body 63 of the harvester 6 is, as is known, composed of a plurality of magnets 631, 632, . . . , joined together to form a chain.

Figure 3:
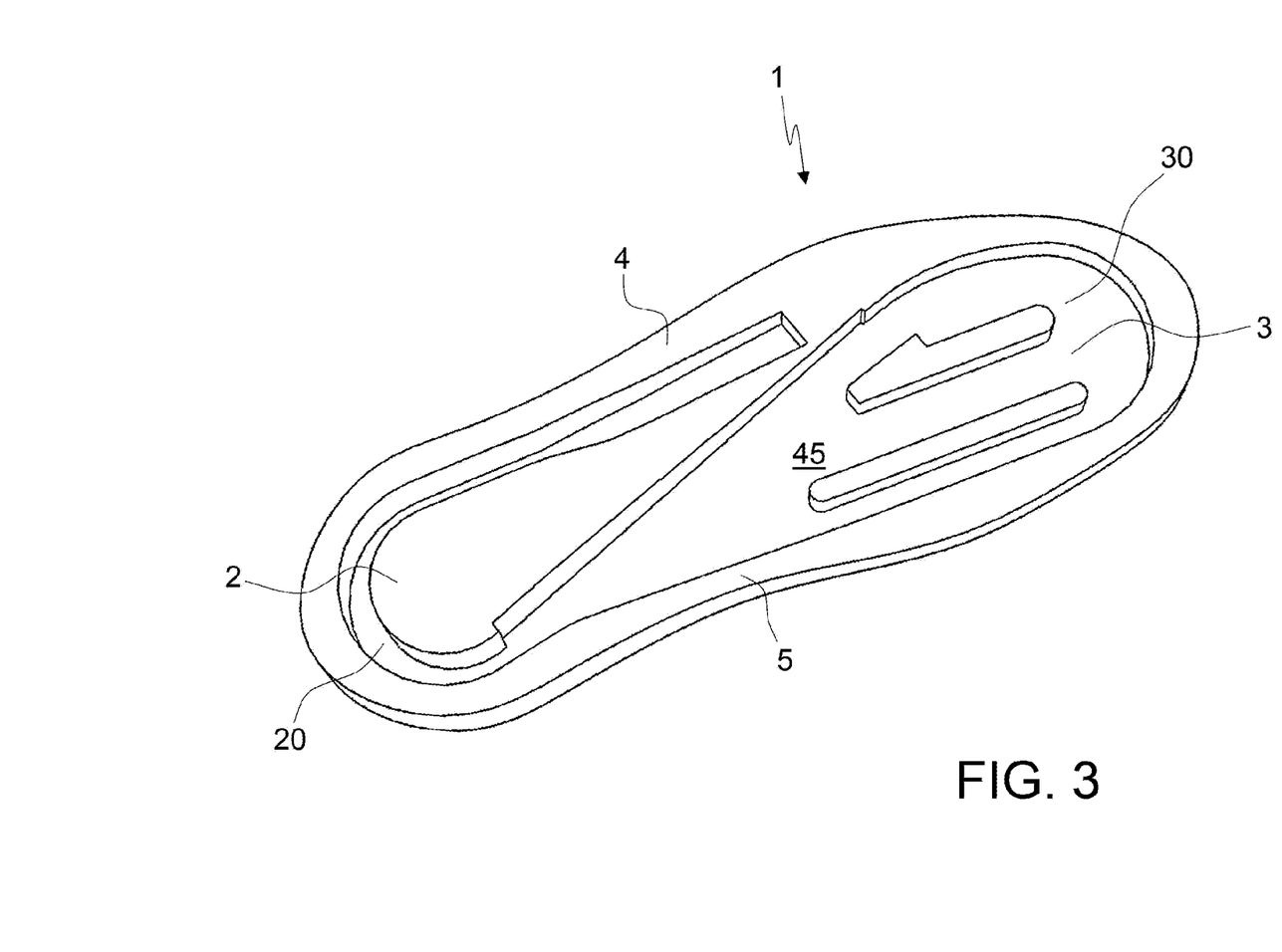
FIG. 3 illustrates a side-elevation perspective view, with transparent parts, of the sole for footwear of FIG. 1 lacking components.
Figure 4:
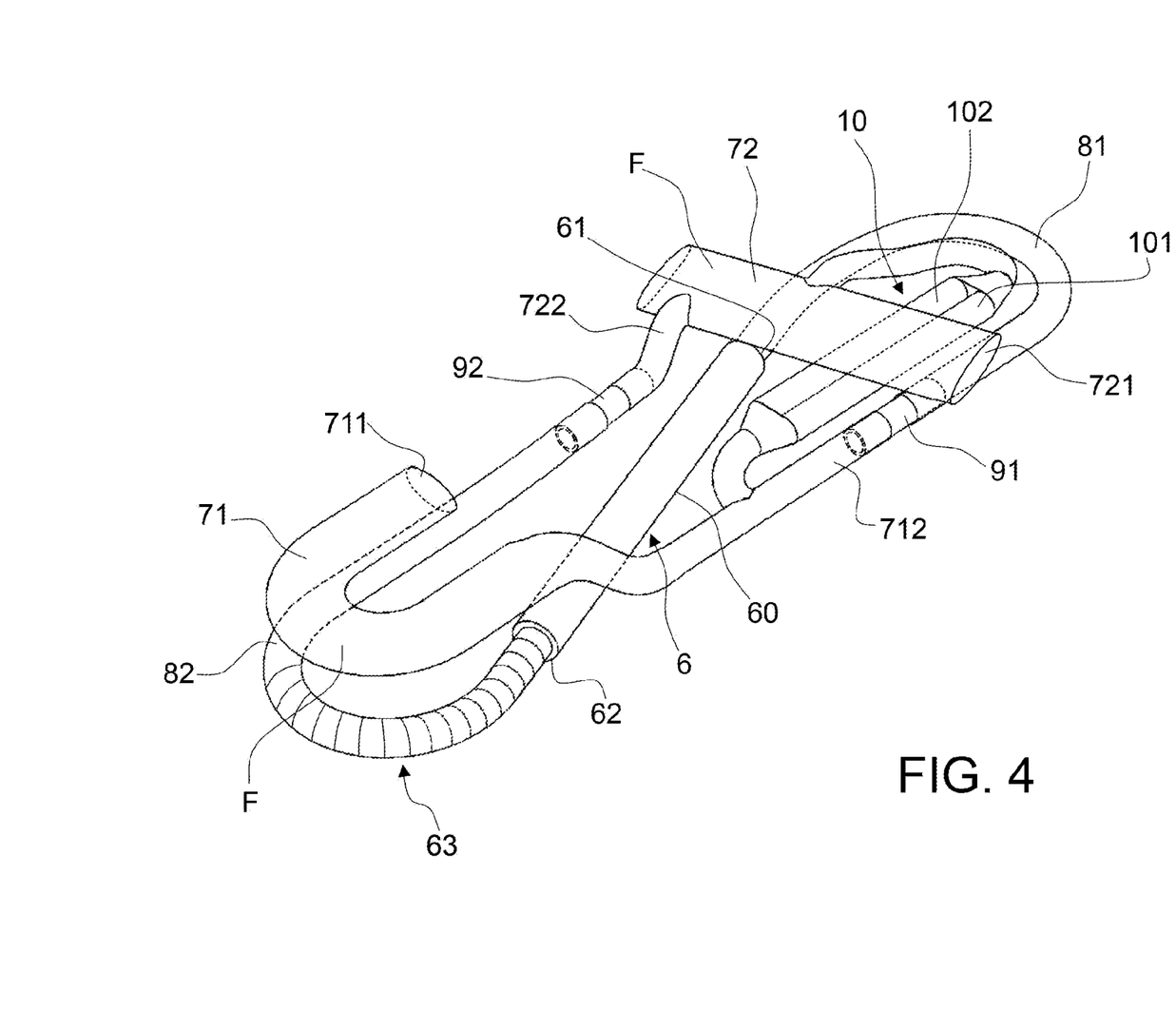
FIG. 4 is a side-elevation perspective view, with transparent parts, of the components housable in the sole of FIG. 3.
Figure 5:
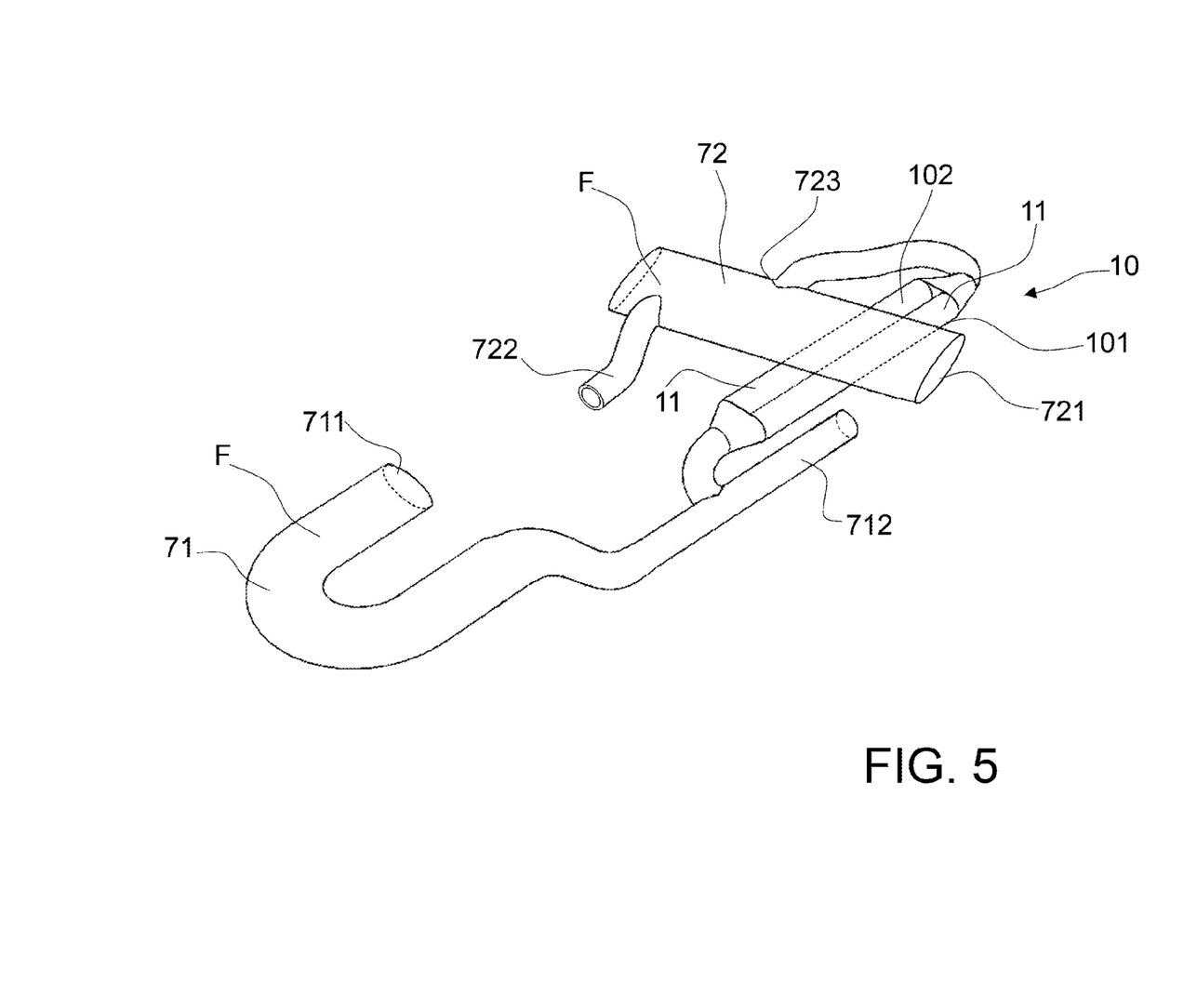
FIG. 5 shows a side-elevation perspective view, with transparent parts, of part of the actuator group of the sole for footwear according to the present invention.
Figure 6:
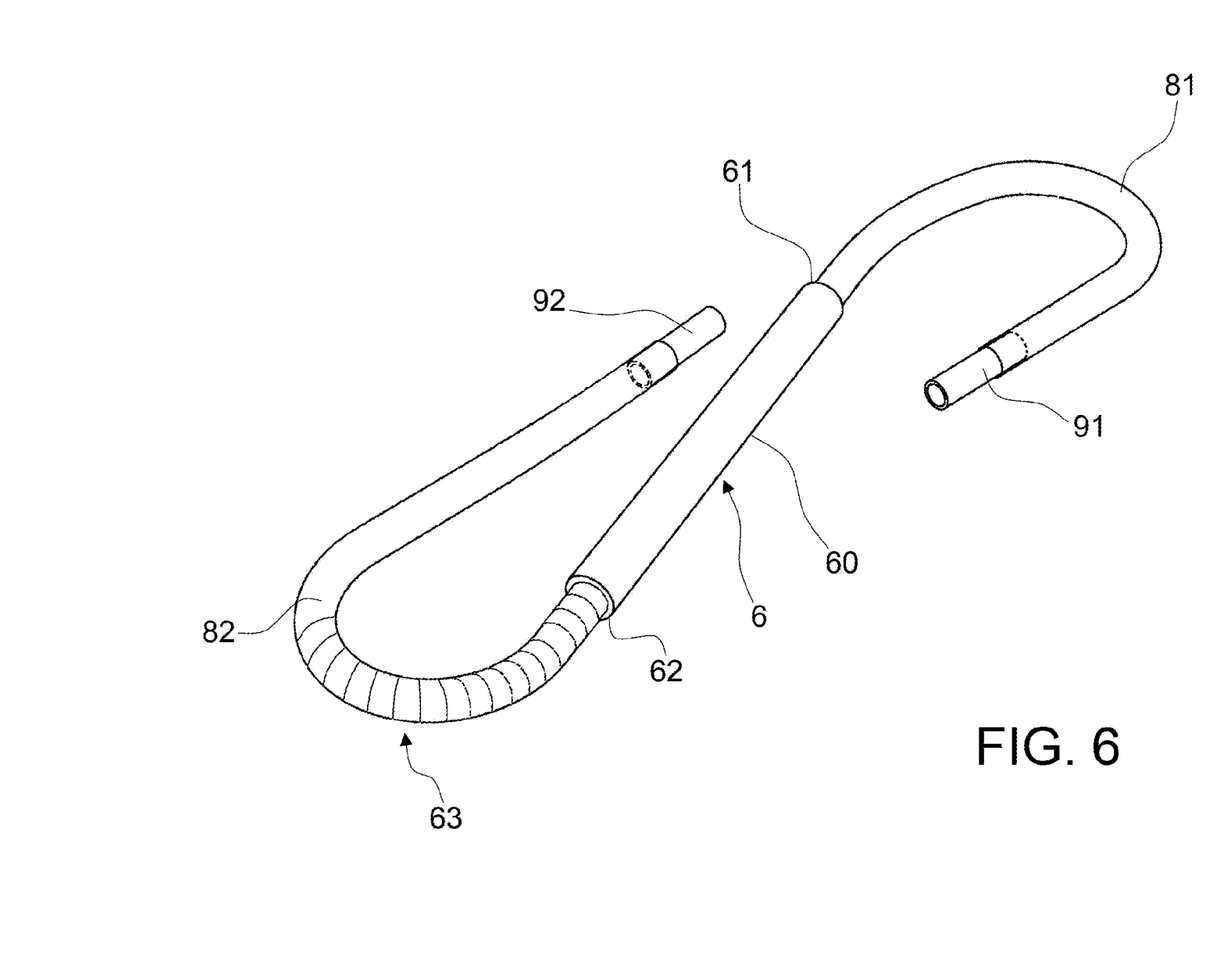
FIG. 6 illustrates a side-elevation perspective view, with transparent parts, of the energy harvester and of part of the actuator group of the sole for footwear according to the present invention.

The energy harvester 6 is preferably housed in a central portion of the sole, at a housing seat 45 provided for such purpose (see FIG. 3).

More particularly, the body 60 of the energy harvester 6 extends longitudinally with its first end 61 at an external lateral front area, and with the other end thereof, the second end 62, at an internal lateral rear area of the sole.

The sole according to the present invention further comprises at least one actuator group 7 for operating the energy harvester 6.

The actuator group 7 comprises a fluid-dynamic circuit including at least one first fluid tank 71 in fluid communication with the first end 61 of the tubular body 60 of the energy harvester 6 by means of a first joining conduit 81.

The actuator group also comprises a second fluid tank 72, placed in fluid communication with the second end 62 of the tubular body 60 of the energy harvester 6 by means of a second joining conduit 82.

Figure 1:
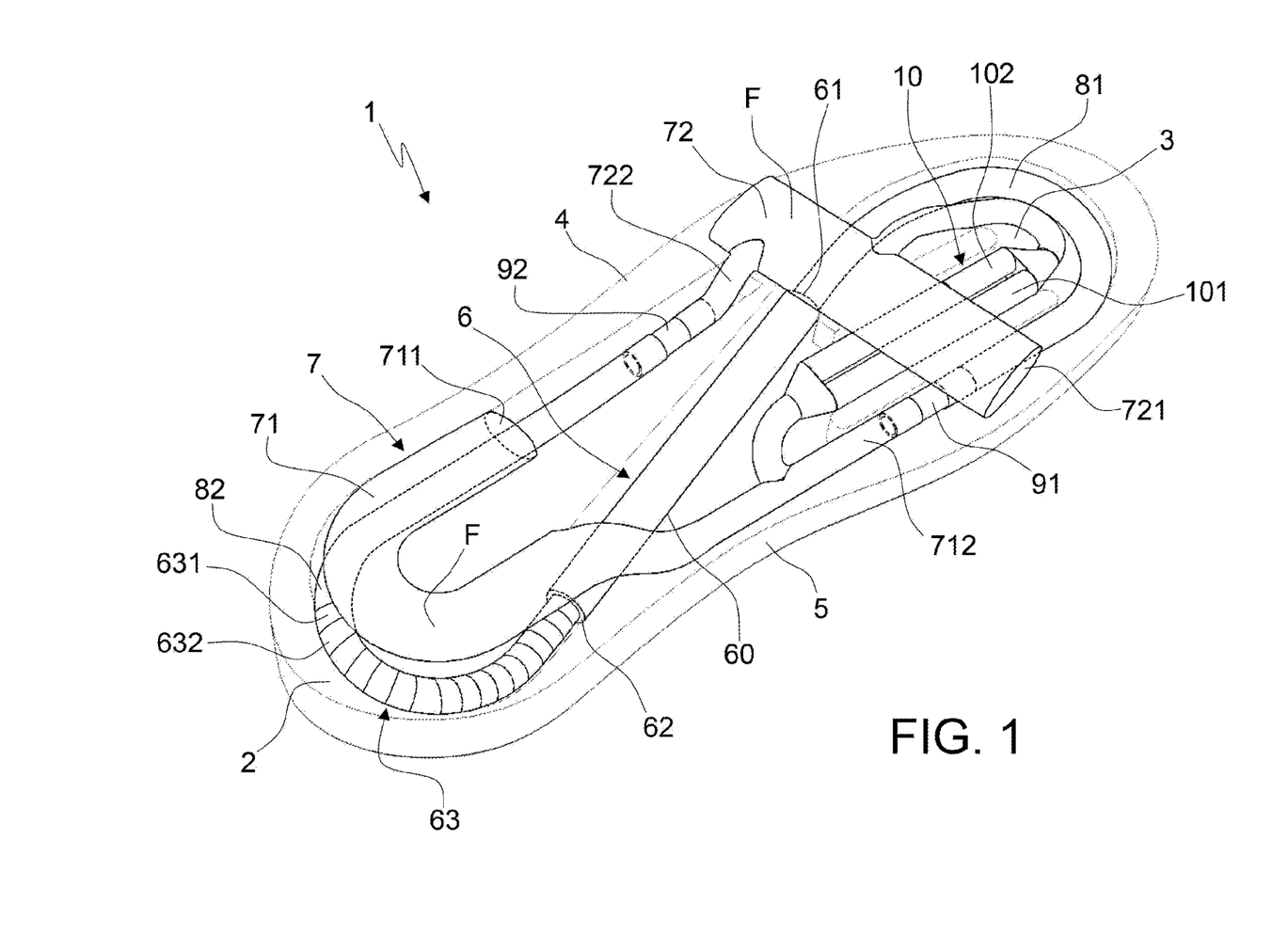
FIG. 1 is a side-elevation perspective view, with transparent parts, of a sole for footwear according to the present invention.
Figure 2:
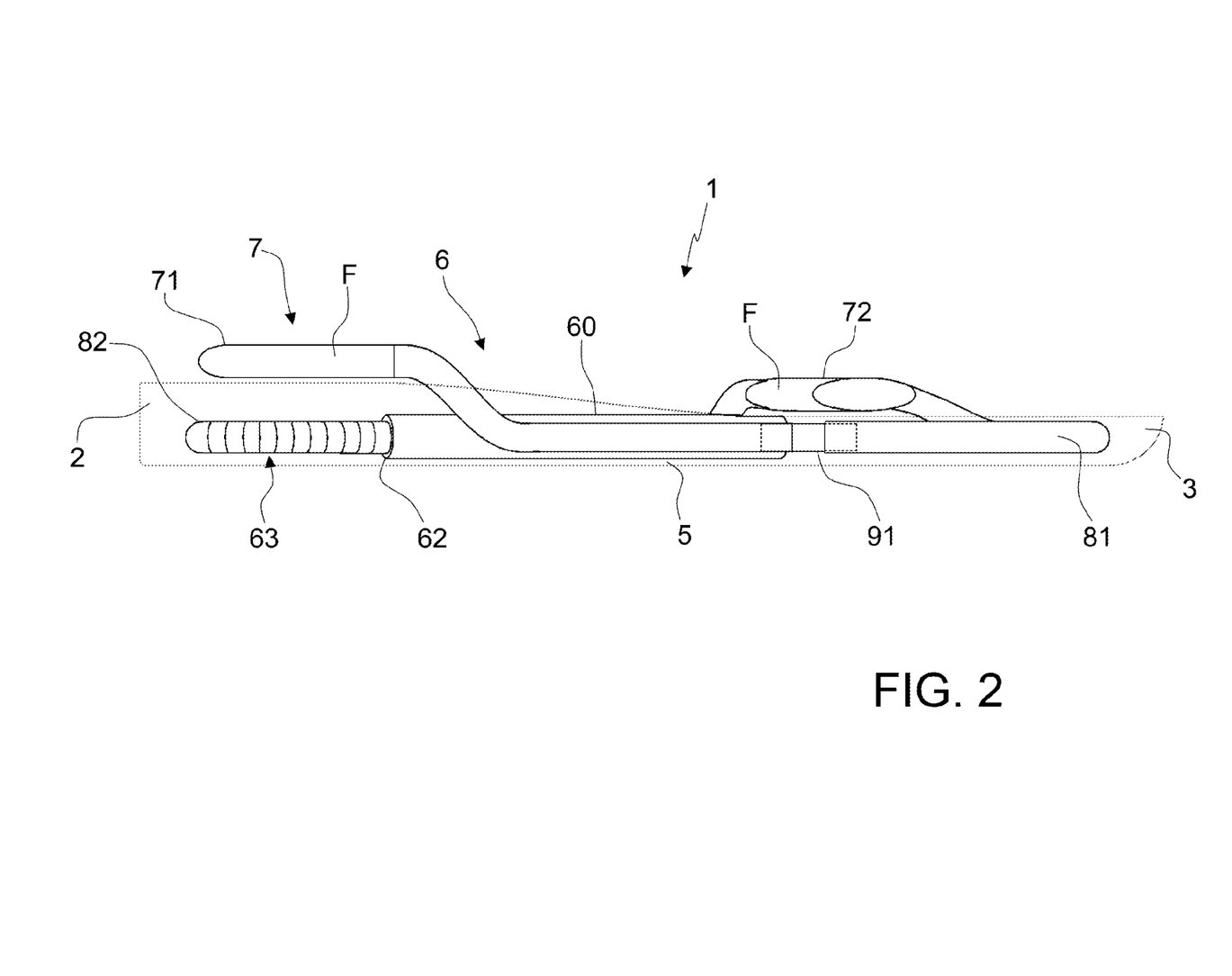
FIG. 2 shows a side view, with transparent parts, of the sole for footwear of FIG. 1.

As seen in FIGS. 1 and 2, the movable part 63 of the energy harvester 6 has longitudinal extension greater than the longitudinal extension of the tubular body 60; in the case illustrated in the figures, such longitudinal extension is approximately double the tubular body, such that it is partially housed in the joining conduits 81 and/or 82 of the actuator group 7.

The movable part 63 of the energy harvester 6 is provided, during use, slidable to fit in the tubular body 60 and in the joining conduits 81 and 82 of the actuator group 7, both towards the first tank 71 and towards the second tank 72.

Advantageously, the first tank 71 of the actuator group 7 is housed at the rear area 2 of the sole and has a configuration in plan view, which is substantially elongated and curved, U-shaped in the illustrated embodiment. More particularly, such tank 71 is arranged in the rear area 2 of the sole in a manner so as to have a blind end 711 thereof at the outer side portion 4 of the sole and the other end 712 thereof for connection with the first end 61 of the tubular body 60 at an inner side portion 5 of the sole itself. The fluid connection between the first tank 71 and the first end 61 occurs by means of the first joining conduit 81, connected to the tank by means of a fluid-seal connector 91.

The second tank 72 of the sole according to the present invention is housed at the front area 3 of the sole and has a configuration in plan view which is substantially elongated, and more particularly polygonal, rectangular or parallelogram in the illustrated example.

Such second tank 72 is housed in the sole transversely arranged in the front area 3, in a manner so as to have a blind end 721 thereof at an inner side portion 5 of the sole, and the other end 722 thereof, for connection with the second end 62 of the tubular body 60 at an outer side portion 4 of said sole. The blind end 721 of the tank 72 is more advanced in the sole with respect to the other end 722.

The fluid connection between the second tank 72 and the second end 62 occurs by means of the second joining conduit 82, connected to the tank by means of a fluid-seal connector 92.

In the shoe according to the present invention, the first and the second tank 71 and 72 are provided for containing a fluid F, preferably an inert and non-toxic liquid such as water or glycerin. The tanks are also made of a non-rigid plastic material, for example thermoplastic polyurethane, and intended to be compressed under the weight of the foot during deambulation.

The joining conduits 81 and 82 are instead made of a more rigid material, e.g. nylon, and are housed at a front area 3 and rear area 2 of the sole, respectively. The joining conduits 81 and 82 are extended in the respective portions of the sole, housed in housing seats, 30 and 20, respectively, obtained for such purpose, substantially along the perimeter edges of the sole.

As stated above, the first and the second joining conduit 81 and 82 of the actuator group 7 are in fluid connection with the respective tanks by means of seal connectors 91 and 92. The fluid F contained in the tanks, therefore, wets the ends of the movable body 63 of the energy harvester 6. The movable body 63 slides to size in the conduits 81 and 82, which will therefore have suitable size and will be made of a suitable material (at least on their internal surface) that minimizes the friction between the movable body and the conduit itself.

With one such configuration, it will be easily understood that, during deambulation, when the first tank 71 is compressed due to the force exerted by the foot on the sole during the heel strike phase, the fluid F contained therein is effectively thrust towards the connection end 712 of the tank and, by means of the joining conduit 81, towards the first end 61 of the harvester. The fluid F in turn thrusts the movable body 63 in the harvester towards the second tank 72.

Conversely, when the force exerted by the foot on the sole passes from the rear area 2 to the front area 3 thereof, during the phase of strike of the front portion of the foot and before the lifting up of the foot from the ground, the second tank 72 is compressed and the fluid F contained therein is thrust to return towards the connection end 722 of the tank itself and, by means of the joining conduit 82, towards the second end 62 of the tubular body 60 of the harvester 6. The movement of the fluid F causes the sliding of the movable body 63 in the harvester 6 towards the first tank 71.

There is therefore generated a sliding in one direction and in the other of the movable body 63 in the tubular body 60 of the harvester and this allows, in a known manner, described in the document WO 2014/028799, the generation of electrical energy according to the Faraday electromagnetic induction law.

The man skilled in the art will easily understand that the particular configuration of the first and second tank 71 and 72 (more particularly of the first tank 71), their arrangement in the sole as well as the position of the respective fluid connection ends 712 and 722 allow optimizing the propulsive thrust of the fluid F inside the actuator group 7 during deambulation. As is known, during deambulation the foot first strikes against the external rear portion of the heel, after which it strikes against the central portion and front portion, along the so-called "pronation" line, which actually represents a kind of "S".

The arrangement of the harvester 6 and of the actuator group 7 allows the fluid F to follow this S-like line, thus optimizing the thrust on the movable body of the harvester 6 and, accordingly, the conversion of such thrust into electrical energy.

Advantageously, the sole according to the present invention comprises a bypass portion 10 for direct fluid communication between the first and the second tank 71 and 72.

Such bypass portion 10 acts as a group for regulating the pressures in the tanks. Indeed, it was verified that in some circumstances, although infrequently, the pressure exerted simultaneously on the first tank 71 and on the second tank 72 of the actuator group 7 is approximately the same in the same time interval, with the result that the fluid F contained in the tanks is substantially not moved between one tank and the other, and hence no thrust is generated on the movable body 63 of the energy harvester 6. Therefore, the energy produced with the deambulation is not converted into electrical energy.

In order to overcome this situation and allow the sole according to the present invention to exploit, in any work condition, the energy produced with the deambulation by converting it into electrical energy, the bypass portion of the actuator group 7 comprises at least one delivery portion 101 and one return portion 102 between the tanks 72 and 71, in each portion a valve means 11 being mounted, preferably of nonreturn type. The bypass portion 10 is advantageously provided between the connection end 712 of the first tank 71 and a front central portion 723 of the second tank 72. It is made of the same material used for the tanks 71 and 72, and preferably is integral therewith.

The bypass portion 10 of the sole according to the present invention is provided for allowing the passage of fluid F therethrough only if the pressure is substantially equal between the tanks or is too high, e.g. higher than a predetermined threshold value, in one of the tanks. In normal work conditions of the sole, there is no passage of the fluid into the delivery and return portions 101 and 102.

The passage of fluid in the bypass portion 10 allows regulating the quantity of fluid F between the tanks and the pressures involved, such that during deambulation the movable body 63 of the energy harvester 6 is always moved by the fluid F with respect to the fixed body 60 and the energy produced with the deambulation is always converted into electrical energy.

It will also be observed that with one such configuration of the bypass portion 10, the risk of compromising the seal of the tanks and, therefore, the functionality of the system is drastically reduced.

Figure 7:
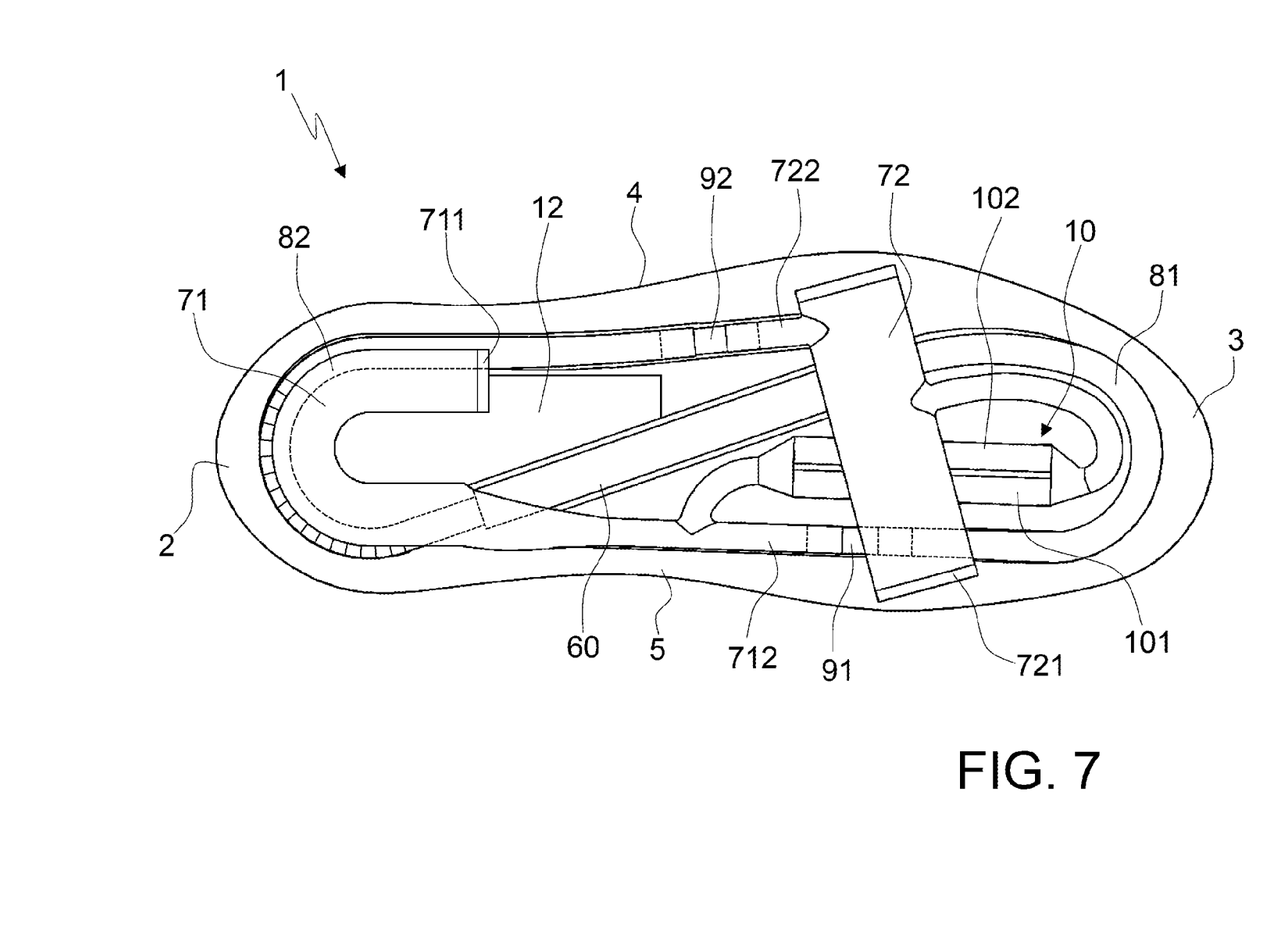
FIG. 7 is a plan view of the sole for footwear according to the present invention.
Figure 8A:
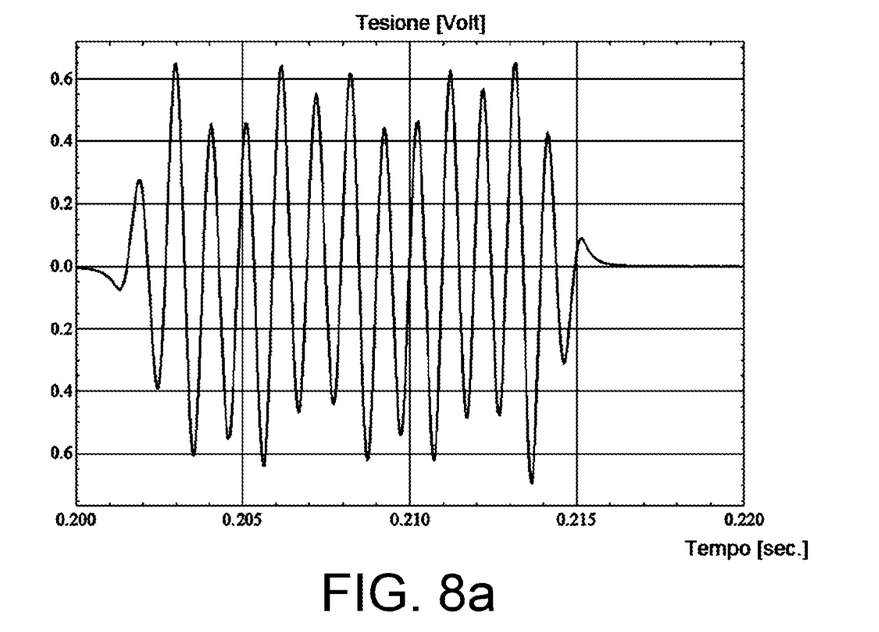
FIGS. 8a and 8b show the graphs of the course of the voltage and power recoverable by the sole according to the present invention during a strike of the foot.
Figure 8B:
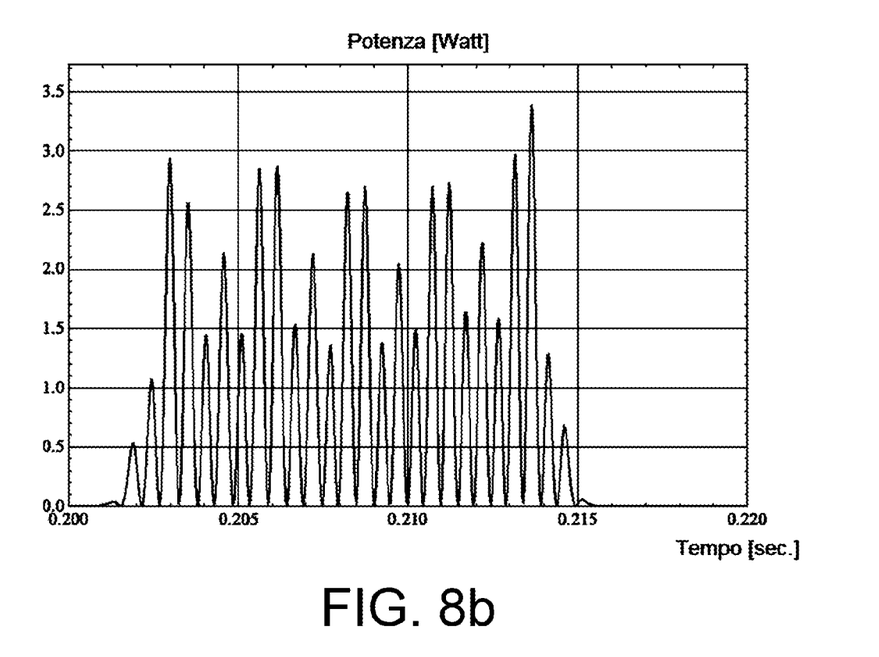

The sole for footwear according to the present invention also comprises means for accumulating/dispensing 12 (see FIG. 7) the electrical energy produced by the energy harvester 6. Such accumulating/dispensing means are electrically connected to the energy harvester 6 in a manner known for the man skilled in the art and allow delivering energy at variable frequency ranging from 0.1 to 1 KHz, low voltage and low output impedance, as illustrated by way of example in FIG. 8. The means are provided in the sole at the rear portion 2, for example supported by the sole itself, as illustrated in FIG. 7, housed in a respective housing seat obtained therein, for example below the first tank 71.

Such accumulating/dispensing 12 means are electrically connected to input/output means not illustrated in the drawings, for the connection of the sole to an electronic device.

The input/output means can for example comprise a USB port, advantageously housed in a known manner in the sole or in another suitable place of the upper.

The means for accumulating/dispensing 12 the electrical energy produced by the energy harvester 6 can also be directly connected to consumer electronic devices (also not depicted in the drawings) that are also housed in the sole. Such devices can, for example, comprise a GPS or one or more accelerometers or one or more sensors or one or more SOCs (system on chip) or a MP3 player or possible combinations thereof, in turn connectable, preferably remotely, to auxiliary consumer electronic devices, such as one or more LED lights and/or a computer and/or a smart-phone and/or a smart-watch and/or, in the case of the MP3 player, wireless head-phones.

Now, returning to the means for accumulating/dispensing energy 12 of the sole according to the present invention, according to one variant of the sole not illustrated in the drawings, in place of the energy harvesting means 6 a plurality of such energy harvesting means 6 are provided, arranged in series with each other and each electrically connected to the means for accumulating/dispensing energy 12.

According to a further variant, also not illustrated in the drawings, the energy harvesting means 6 can comprise a plurality of tubular sections or segments, arranged in series with each other to form the tubular body 60. The movable part or body 63 is slidably inserted in such sections or segments, as described above. Each section or segment of the plurality of sections or segments is electrically connected to the means for accumulating/dispensing energy 12.

In both variants, the means for accumulating/dispensing energy 12 advantageously comprise a plurality of rectifier means, preferably of active type with MOS and comparator, each arranged downstream of a respective energy harvester 6 or section or segment thereof, in turn electrically controlled by a selector group or MUX. A possible charge pump switching regulator may be present downstream of the selector group, if the energy harvesting means 6 provide an electrical pulse with voltage, after rectification, e.g. less than about 3V.

This configuration allows maximizing the quantity of energy recovered from the deambulation, emitted by the energy harvester 6 group. Experimental tests in fact demonstrate that, with one such configuration, it is possible to recover and make available approximately 80% of the energy delivered by each energy harvester 6.

The means for accumulating/dispensing energy 12 further comprise accumulator means, electrically connected downstream of the selector group and possible regulator, and advantageously comprising a supercapacitor, in technical jargon termed "supercap", and a battery of the polymer/lithium ion type (or any other suitable type).

The supercapacitor acts as a buffer for the battery, mitigating the effects due to the high voltage and current peaks, and providing a very low input impedance, in a manner so as to quickly accumulate (much faster than the battery) current pulses that are even quite high (on the order of tens of Amperes), without losing significant energy. The "supercap" then provides the battery with the energy temporarily accumulated in a continuous manner and with limited currents (on the order of hundreds of mA).

The accumulator means allow effectively accumulating the energy delivered by the energy harvesting means 6 and make it constantly available for an electronic device of the type mentioned above and in the requested voltage.

It will be observed that the a sole for footwear is herein provided as described above and, in particular, by the particular configuration of the actuator group 7 and by its particular connection to the energy harvester 6, of the type with magnets 631, 632, . . . described above, as well as by the connection of the latter to the accumulating/dispensing means 12 equipped with the abovementioned rectifier means and the accumulator means with supercap and lithium battery.

The above-described sole for footwear is susceptible of numerous modifications and variants within the protection scope of the following claims.

Thus, for example, the sole according to the present invention has been described by taking under consideration a left shoe; of course, the present description holds true, mutatis mutandis, for a corresponding sole for a right shoe.

The invention claimed is:

1. Sole for footwear capable of recovering part of the energy produced during deambulation comprising:

an energy harvesting arrangement comprising: a tubular body, fixed in use, having a first and a second end; a movable part slidable in said tubular body; said energy harvesting arrangement being designed, in use, for generating electric energy following the sliding of said movable part with respect to said, fixed in use, tubular body, during said deambulation;

an actuator group for said energy harvesting arrangement, comprising a fluid-dynamic circuit including: a first and a second tank comprising a fluid, said first tank being housed at a rear area of said sole, and said second tank being housed at a front area of said sole; a first and a second joining conduit disposed in fluid communication between said first tank and said first end of said tubular body and between said second tank and said second end of said tubular body, respectively; said movable part of said energy harvesting arrangement being partially housed in said actuator group and able to slide in a forward and a rearward direction therein and in said tubular body, during said deambulation; and a device configured to accumulate and dispense said electric energy produced by said energy harvesting arrangement, said device being electrically connected to said energy harvesting arrangement;

wherein said first tank has a plant configuration which is substantially elongated and curved;

wherein said plant configuration of said first tank is U-shaped;

wherein said first tank with a substantially U-shaped configuration has a first end thereof which is closed at a first outer side portion of said sole and an opposite end thereof that is connected to said first end of said tubular body by said first joining conduit at an inner side portion of said sole; and wherein said actuator group comprises a bypass portion for direct fluid communication between said first and said second tank, wherein said fluid is designed to flow when pressure generated during deambulation in said tanks is substantially equal to or, in any of said tanks, greater than a predetermined threshold value.

2. Sole according to claim 1, wherein said second tank has a plant configuration which is substantially elongated.

3. Sole according to claim 2, wherein said second tank with substantially elongated configuration is placed transversally in said front area of said sole and includes one first closed end at an inner side portion of said sole and an opposite end thereof that is connected to said second end of said tubular body by said second joining conduit at an outer side portion of said sole.

4. Sole according to claim 1, wherein said bypass portion for direct fluid communication between said first and said second tank comprises a delivery portion and a return portion between said tanks, in each of said portions being fit inserted at least a valve member.

5. Sole according to claim 4, wherein said valve member is of the nonreturn type.

6. Sole according to claim 1, wherein said bypass portion for direct fluid communication between said first and said second tank is comprised between said end for connection to said first tank and a front central portion of said second tank.

7. Sole according to claim 1, wherein said first and said second joining conduit are made of a rigid material.

8. Sole according to claim 1, wherein said first joining conduit is housed at a front area of said sole, and said second joining conduit is housed at a rear area of said sole.

9. Sole according to claim 1, wherein said device is housed at a rear area of said sole, below said first tank.

10. Sole according to claim 1, comprising an input and an output operatively connected to said device for connecting said sole to an electronic device.

11. Sole according to claim 10, wherein said input and output comprise a USB-port.

12. Sole according to claim 1, wherein said device is directly connected to consumer electronic devices housed in the sole.

13. Sole according to claim 12, wherein said consumer electronic devices comprise at least one of a GPS, accelerometer, sensor, SOC, and an MP3 player, which are in turn remote connectable to auxiliary consumer electronic devices.

14. Sole according to claim 13, wherein said auxiliary consumer electronic devices comprise at least one of LED lights, a computer, a smartphone, a smart-watch, and wireless head-phones.

* * * * *